(12) United States Patent
Harris

(10) Patent No.: US 8,843,534 B2
(45) Date of Patent: Sep. 23, 2014

(54) VIRTUAL SESSION ON A REMOVABLE MEMORY

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 2154 days.

(21) Appl. No.: 11/738,737

(22) Filed: Apr. 23, 2007

(65) Prior Publication Data

US 2009/0100157 A1  Apr. 16, 2009

(51) Int. Cl.
  *G06F 7/00* (2006.01)
  *G06F 17/00* (2006.01)
  *G06F 12/00* (2006.01)
  *G06F 17/30* (2006.01)
  *G06F 13/00* (2006.01)
  *G06F 13/28* (2006.01)
  *G06F 9/445* (2006.01)
  *H04L 9/32* (2006.01)

(52) U.S. Cl.
  USPC ........... 707/825; 707/667; 707/668; 707/821; 707/822; 717/174; 711/115; 713/176

(58) Field of Classification Search
  USPC ........ 707/10, 102, 104.1, 200, 201, 667, 668, 707/821, 822, 825; 717/174; 711/115; 713/176
  See application file for complete search history.

(56) References Cited

U.S. PATENT DOCUMENTS

| | | | |
|---|---|---|---|
| 2005/0081198 A1* | 4/2005 | Cho et al. | 717/174 |
| 2006/0195479 A1* | 8/2006 | Spiegelman et al. | 707/104.1 |
| 2007/0094508 A1* | 4/2007 | Palum et al. | 713/176 |
| 2008/0005121 A1* | 1/2008 | Lam et al. | 707/10 |
| 2008/0010405 A1* | 1/2008 | Allen et al. | 711/115 |
| 2009/0019075 A1* | 1/2009 | Hutchinson et al. | 707/102 |

* cited by examiner

*Primary Examiner* — Ajay Bhatia
*Assistant Examiner* — Cheryl M Shechtman
(74) *Attorney, Agent, or Firm* — Law Office of Scott C. Harris, Inc.

(57) ABSTRACT

A virtual session for a computer in which files that are worked on or automatically stored to a portable device such as a hard drive. Depending on the options that are selected, helper files for those programs may also be stored. Those helper files may be files that enable reading the programs, for example, or may be a complete new OS.

9 Claims, 2 Drawing Sheets

VIRTUAL SESSION ON A REMOVABLE MEMORY

BACKGROUND

The storage capacity of removable disks such as USB drives and others has markedly increased. The initial drives maxed out at double-digit megabytes, and current drives are available in double-digit gigabytes. Many different applications for such drives are contemplated.

A user can store their personal files on a drive like this, and use those files in a different computer. However, the user must manually store and keep track of files.

SUMMARY

The present application describes a virtual session which can be carried out using a portable memory device, in which various aspects of operation of a computer, called herein a 'session', are stored on the device. The file(s) on the device can then be used on a different computer, so that the user has access to many of the items that they need while on that different computer.

Different aspects are described as embodiments, including the ability to monitor for changes to the portable device even when the portable device is not physically installed.

BRIEF DESCRIPTION OF THE DRAWINGS

These and other aspects will now be described in detail with reference to the accompanying drawings, wherein.

DETAILED DESCRIPTION

When a user sits down at a computer to do work, they often do the same things over and over again. For example, they may be working on a document, such as a Word™-based document. They may be searching the Internet. They may be checking e-mails. Different users may do different things, but whether they are at computer1 or computer2, most users do the same 20 things on that computer.

The present application describes storing a file that includes information about some or all of the information related to all the things the user is likely to do while on a computer. In the embodiment, this file can be stored as a combined file that has information about multiple things, e.g. an archive or some other single directory that includes multiple parts for multiple files. In an embodiment, new parts of the file can be added, and old parts of the file can be removed. The contents of the file may also be selected. For example, all files that have been used within the last four weeks may be included, as well as helper files, files like pictures and videos, and others.

Another embodiment describes that the files can be selected when the portable device, e.g. a portable hard drive, is not physically attached, and that these files are then updated when the drive is later attached.

Figure 1:
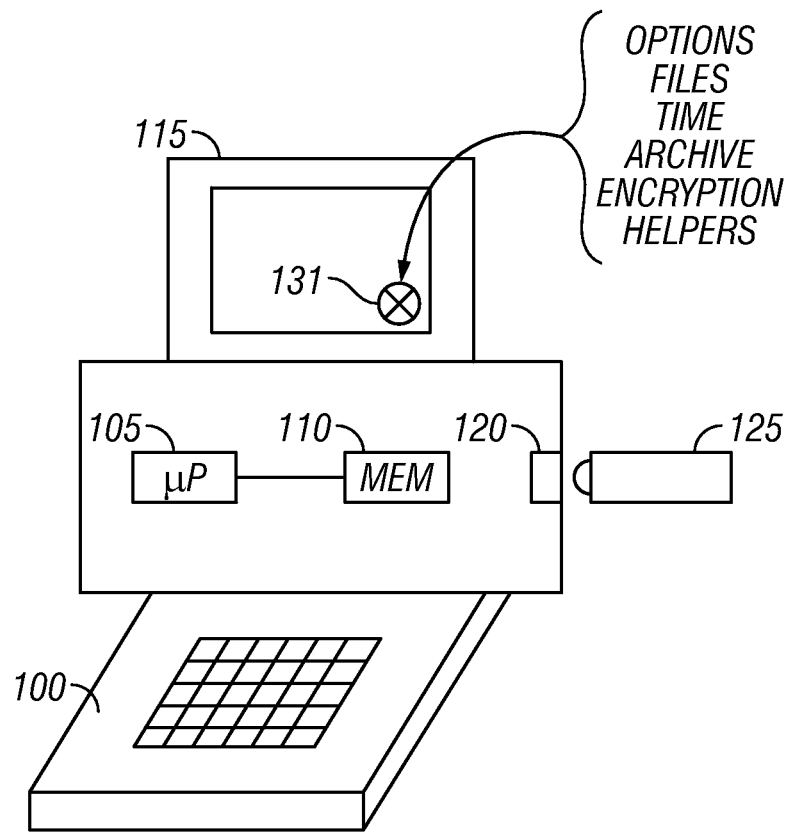
FIG. 1 shows an overall computer system in which the system can be used.

FIG. 1 illustrates a computer that can be used according to an embodiment. The computer includes a user interface 100, microprocessor 105 memory 110, and a display 115. A port, such as 120, can connect to an external hard drive 125 such as a USB memory stick.

The processor 105 executes programs which are stored on the memory 110.

In an embodiment, a special session program may be run that facilitates identifying information to be used on the hard drive. The session may be a virtual session that either runs directly off the hard drive 125 but also may be resident within memory 110. The session may be indicated by an indicator such as 131, which indicates that a virtual session is in progress. When the user places the cursor over the indicator 131, a screen tip comes up indicating that "virtual session data is available" or not available, and also indicating that for example, options may be available or different files may be available.

Default options for the virtual session is that actions, personal contact and calendar information and files are stored in the archive file that is stored on the hard drive 125. The contact and calendar information may be the same kind of information that is stored in "Outlook", and may include any or all of a calendar, e-mail information, to do information, as well as personal contacts.

The user can also select, via the options portion that is obtained from the vsession indicator, information about other files to backup/store.

The options also allow storing time information, so that only files which have been accessed or used within a certain amount of time are stored, compression options (compress all files, or compress no files, or compress only files that have not been accessed in x days) as well as archive options. The archive options may be Internet or DVD archive, and may specify what is done with the files that are removed from the main archive when they become older than a certain number of days.

An encryption option may enable the files on the drive 125 to be encrypted so that an unauthorized user can not retrieve those files without entering some kind of identifying information.

In an embodiment, the main archive may store helper programs. Helper programs may be, for example, light versions, or freeware versions of executable programs that enable working on the files. For example, if a Microsoft Word file is stored, then either a light version of Word, or a version of a program such as WordPad, may be stored. These light programs may enable reading the file, and doing some limiting editing of the file, but have less functionality than the full program. Similarly, for a PDF file, the Adobe reader may be stored. The helper versions enable a user to read a file on a public computer which may have no programs whatsoever installed. Other helper programs may be provided for files like pictures, videos e-books and the like.

A helper 'OS" may also be stored. For example, the helper os may be a light version of Windows that can be run directly off the portable hard drive. One example is Windows live, which is a functionality limited program that can be booted directly off the hard drive and is a functionality limited version of the operating system.

The archive file can also store things like pictures, videos, and the like. It can store bookmarks indicating where the user left off on the program, and can also store other things.

Figure 2:
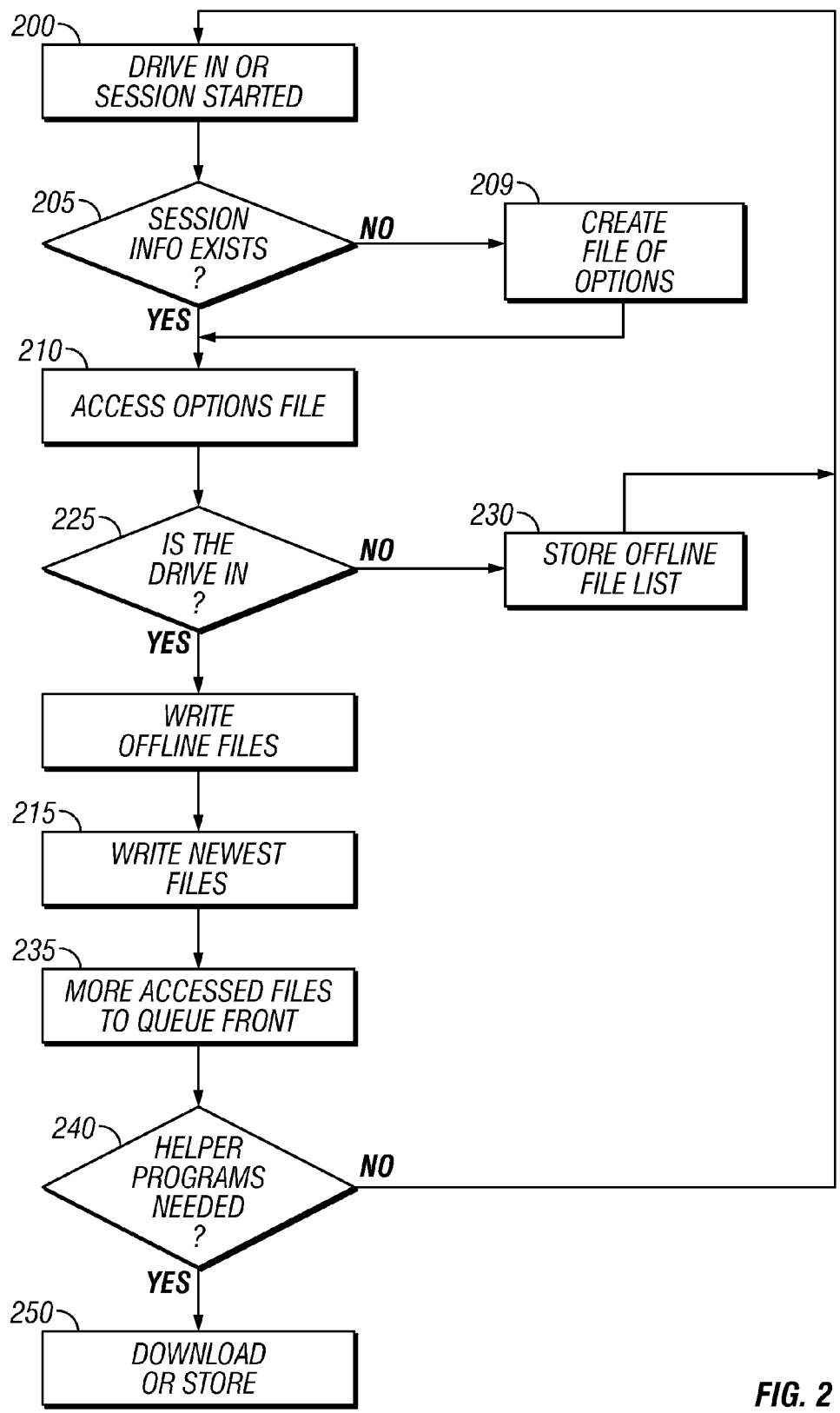
FIG. 2 shows a flowchart of operation of the system.

A flowchart of operation may be as shown in FIG. 2. At 200, the operation begins when the drive is installed, and autoplay has been enabled. This starts the session, which initially looks for session information at 205. If no session information exists, then the system creates a file and asks the user to select options at 209, or else just creates an option file based on defaults. The user can ignore the options selection, and accept the defaults, as described above. However, if the session file exists, the system accesses the file at 210.

At 215, the system provides a list of files that can be accessed, and starts the v session, showing the icon discussed above. Each time a file is accessed, at 220, the session first determines if the drive is still in place at 225. After starting the Vsession, either from the drive 125 or in some other way, the drive can be removed. If the drive is not in place at 225, then the file being accessed is stored at 230 to a list of files on the computer memory 110, for later use.

If the drive is still in place, than the file is updated, with a new date, in essence moved to the file front at 235. 240 indicates determining whether a helper program has been selected or is needed. For example, if a "word" file is added for the first time, 240 may indicate that a helper program could be added. The helper program may already be part of the virtual session software, or may be downloaded at 250.

Figure 3:
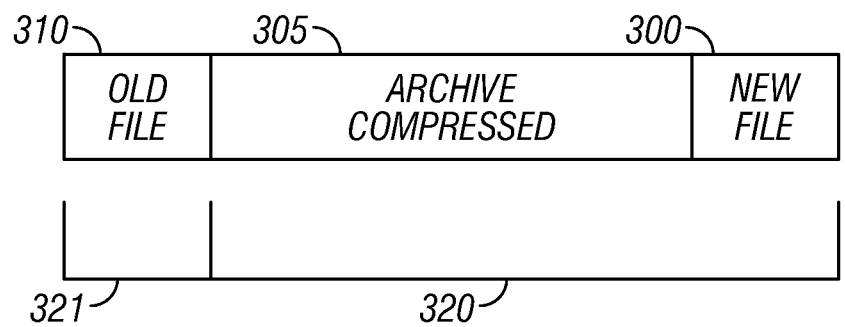
FIG. 3 illustrates an exemplary file structure.

The file structure may be of the form shown in FIG. 3. New files, that is those that are currently being worked on, are shown as 300. These may be files which have been accessed in the last 24 hours or more generally, in the next x hours. A compressed archive of files is shown as 305. These files may be compressed using any compression utility such as zip or RAR or the like. Certain files of this type, e.g, word processing files, may be highly compressible, and this may allow more files to be stored on the unit. Old files are files that are older than the default information, e.g., files that have not been accessed in the last 30 days.

For example, if the default for them length of old files and set to 30 days, the old files 310 are files that are older than the 30 day limit. Depending on the options that are selected, these files may be deleted to the recycle bin, or stored in a special way to the Internet to an archive site, Another option sets a total archive size. For example, the archive size, including helper programs, contact information, and everything else that is going to be stored in the archive, may be set as a maximum file length shown as 320. This may be, for example, 80% or 90% of the drive size, e.g., for a 4 MB drive, a size of the total file(s) from the v session may be limited at 3.6 MB, with new files forcing older files to be deleted. A specified portion of that size 321 may be reserved for old files that were be recycled. In the embodiment, as the drive 125 runs out of room, the oldest files are dropped.

The file structure shown in FIG. 3 is a conceptual structure, and not necessarily representative of the actual way that the files are stored. On the memory, the files are stored in areas/sectionrs,/based on wherever there is room. The files are sorted by date, although they may be physically stored at any location within the memory. However, the conceptual storage in FIG. 3 allows the files to be stored like a pile of paper. The newest files are on the top, other files on the bottom, and the old files 310 which are the files that can be thrown away or put in a file cabinet.

The file(s) shown as 300, 305, 310 may be not only files that are being worked on, but may also be user profiles, and helper programs. In one embodiment, a priority may be set so that helper files would be deleted before files less than x days old.

The off-line version, which is started at 225, stores the file, and writes it to the file whenever the portable storage whenever the file system is inserted. In this way, the program can run in the background, but later senses the stick and "updates". The update may be via a synchronization for example.

In another embodiment, the helper OS may provide a graphical user environment which is a generic operating system that allows operating the light versions of the programs.

The general structure and techniques, and more specific embodiments which can be used to effect different ways of carrying out the more general goals are described herein.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while a USB memory device may be contemplated, other probable memory devices may be used, including a wireless access hard drive, accessible by wireless network (802.11), wimax, Bluetooth, or others.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based, Network Attached Storage (NAS), or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned.

What is claimed is:

1. A device, comprising:
a file structure that enables storing a plurality of files, and stores information indicative of when those files were accessed; and
a set of instructions, which when executed by a computer, cause files which meet certain criteria to be automatically stored on a portable memory based on when said files are accessed, wherein said set of instructions further comprise instructions for causing the computer to determine whether the portable memory is connected, to store accessed files when connected, and to store an indication of the accessed files when the portable memory is not connected.

2. A device as in claim 1, further comprising instructions to detect that the device has been connected after a time when said portable device was not connected but files were accessed, and to store files based on said indication when the portable memory has been reconnected.

3. A device, comprising:
a file structure that enables storing a plurality of files, and stores information indicative of when those files were accessed; and
a set of instructions, which when executed by a computer, cause files which meet certain criteria to be automatically stored on a portable memory based on when said files are accessed, further comprising instructions that cause files that are older than a specified age to be deleted.

4. A device, comprising:

a file structure that enables storing a plurality of files, and stores information indicative of when those files were accessed; and a set of instructions, which when executed by a computer, cause files which meet certain criteria to be automatically stored on a portable memory based on when said files are accessed, further comprising instructions that prevent said plurality of files from exceeding a specified size, by deleting at least one of said files when a new file is added and the new file will cause said plurality of files to exceed said specified size.

5. A method, comprising:

accessing at least one file on a computer system;

responsive to said accessing, automatically determining whether a portable storage device is connected to said computer system;

responsive to detecting that said portable storage device is connected to said computer system, storing first information on said portable storage system about the file that was accessed; and responsive to detecting that the portable storage system is not connected, storing second information about the file on the computer system.

6. A method as in claim 5, wherein said first information is the file itself that is stored on the portable storage device.

7. A method as in claim 6, further comprising detecting that the portable storage device has been connected, reading said second information that was stored when the portable storage system was not connected, and based on said second information, storing the file on the portable storage device.

8. A method as in claim 7, further comprising storing a plurality of said files on the portable storage device, in a logical arrangement such that newest files are stored for the longest time, and all those files are deleted after a specified time.

9. A method as in claim 5, wherein said second information includes changes that are intended to be made to the portable storage device even when the portable storage device is not physically installed.

\* \* \* \* \*